(12) United States Patent
Albers, Jr.

(10) Patent No.: US 6,352,052 B1
(45) Date of Patent: Mar. 5, 2002

(54) CATTLE STANCHION APPARATUS

(76) Inventor: Teo Albers, Jr., 13427 Mountain Ave., Chino, CA (US) 93536

(*) Notice: Subject to any disclaimer, the term of this patent is extended or adjusted under 35 U.S.C. 154(b) by 0 days.

(21) Appl. No.: 09/626,674

(22) Filed: Jul. 27, 2000

(51) Int. Cl.⁷ ................................................. A07K 1/00
(52) U.S. Cl. ........................ 119/524; 119/740; 119/750
(58) Field of Search .................................. 119/740, 750, 119/524

(56) References Cited

U.S. PATENT DOCUMENTS

| | | | |
|---|---|---|---|
| 4,037,566 A | * 7/1977 | Albers | 119/745 |
| 4,051,813 A | * 10/1977 | Albers | 119/741 |
| 4,185,592 A | * 1/1980 | Albers, Sr. | 119/750 |
| 4,476,815 A | * 10/1984 | Albers, Sr. | 119/750 |
| 4,495,897 A | * 1/1985 | Albers, Sr. | 119/750 |
| RE32,728 E | * 8/1988 | Albers, Sr. | 119/750 |
| 4,867,105 A | 9/1989 | Hatfield | |
| 4,930,452 A | 6/1990 | DaSilveria | |
| 5,309,869 A | * 5/1994 | Albers, Jr. | 119/735 |

* cited by examiner

Primary Examiner—Charles T. Jordan
Assistant Examiner—J Lofdahl
(74) Attorney, Agent, or Firm—Fulwider Patton Lee & Utecht (57) ABSTRACT

Cattle stanchion apparatus in which a plurality of fixed and release stanchions define a row of head openings for animals, the release stanchions tending to pivot to open positions. A pair of latch fingers at the upper extremities of the release stanchions are engageable with locking pegs secured to a moveable positioner rod. An operating mechanism is actuable to move the positioner rod and engage the locking pegs into and out of possible engagement with the latch fingers. The arrangement give the dairyman the capability of moving all of the release stanchions to closed positions to lock the animals in the feeding stalls, or allowing the animal's individually to actuate the system to lock themselves in, or allowing the animals to enter and leave the stalls as they wish. The latch fingers are also manually manipulatable to quickly and safely release downed cattle from individual feeding stalls. Additionally, the positioner rod can be operated to train the cows to feed only through the space between the upper portion of the release stanchions.

15 Claims, 10 Drawing Sheets

CATTLE STANCHION APPARATUS

BACKGROUND OF THE INVENTION

The present invention relates to cattle stanchion apparatus, and more particularly to an improved cattle stanchion apparatus capable of actuation to quickly and easily release downed cattle. In Albers U.S. Pat. No. Re 32,728 there is shown cattle stanchion apparatus in which a plurality of fixed and release stanchions define a row of head openings for animals, the release stanchions tending to automatically pivot to open positions. Double latches at the upper extremities of the release stanchions are engageable by couplers carried by a rotatable and axially moveable positioner rod. An operating mechanism is actuable to axially move the positioner and engage the latches of the release stanchions to move them in unison, and an associated rotating mechanism is actuable to rotate the positioner and thereby move the couplers into and out of possible engagement of the latches. This arrangement gives the operator the capability of moving all of the release stanchions to closed positions to lock the animals in the feeding stalls, or allowing the animals individually to actuate the system to lock themselves in, or allowing the animals to enter and leave the stalls as they wish. The latches are manually manipulable to quickly release downed cattle from individual feeding stalls. Each release stanchion is provided with double latches and associated couplers which can be quickly and easily operated to allow movement of the individual release stanchions to enlarge the head opening and permit easy removal of a cow downed in the stall.

Albers U.S. Pat. No. 5,309,869 discloses a modified construction of the cattle stanchion apparatus of Re 32,728.

SUMMARY OF THE INVENTION

The present invention provides cattle stanchion apparatus having improvements over the cattle stanchion apparatus of U.S. Pat. Nos. Re 32,728 and 5,309,869. More particularly, the cattle stanchion apparatus of the present invention utilizes a smoother, quieter latching mechanism for the release stanchions in place of the latch mechanisms shown in U.S. Pat. Nos. Re 32,728 and 5,309,869. The cattle stanchion apparatus of the present invention also facilitates removal of a downed cow from the stanchion apparatus while providing maximum safety for a dairyman. The present apparatus additionally permits training of younger cows that are not yet familiar with the operation of self-locking release stanchions and attempt to enter the stanchion apparatus the wrong way, i.e. by means of the lower space between a release stanchion and a fixed stanchion. The present apparatus selectively permits a cow to enter the stanchion apparatus only through the upper space between a release stanchion and a fixed stanchion.

Other objects and advantages of the present invention will become apparent from consideration of the following detailed description taken in conjunction with the accompanying drawings.

DESCRIPTION OF A PREFERRED EMBODIMENT

Figure 1:
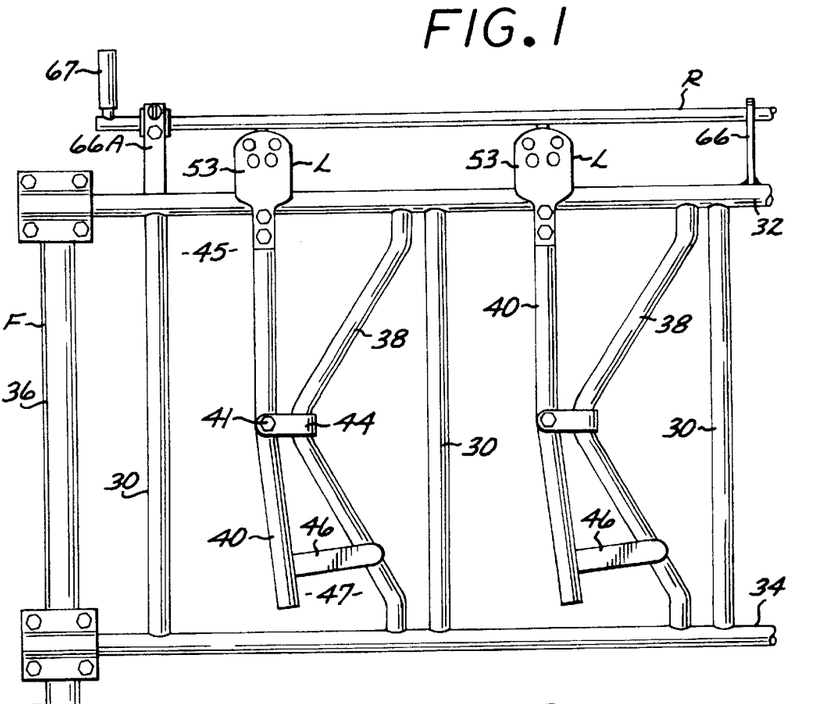
FIG. 1 is a front elevational view of one end of an improved cattle stanchion apparatus embodying the present invention, illustrating the release stanchion in its locked position.
Figure 2:
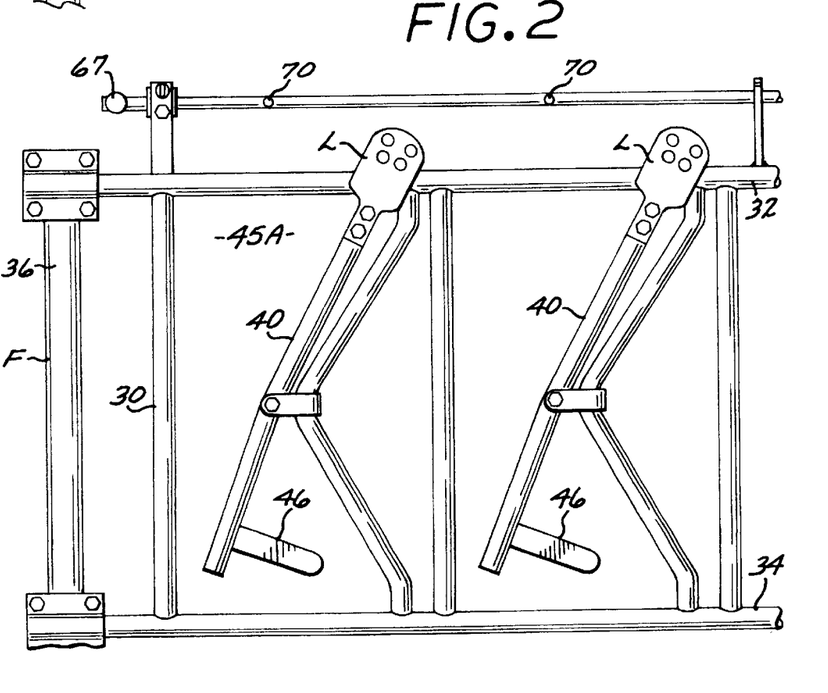
FIG. 2 is a view similar to FIG. 1, but showing the release stanchion in its open position.
Figure 3:
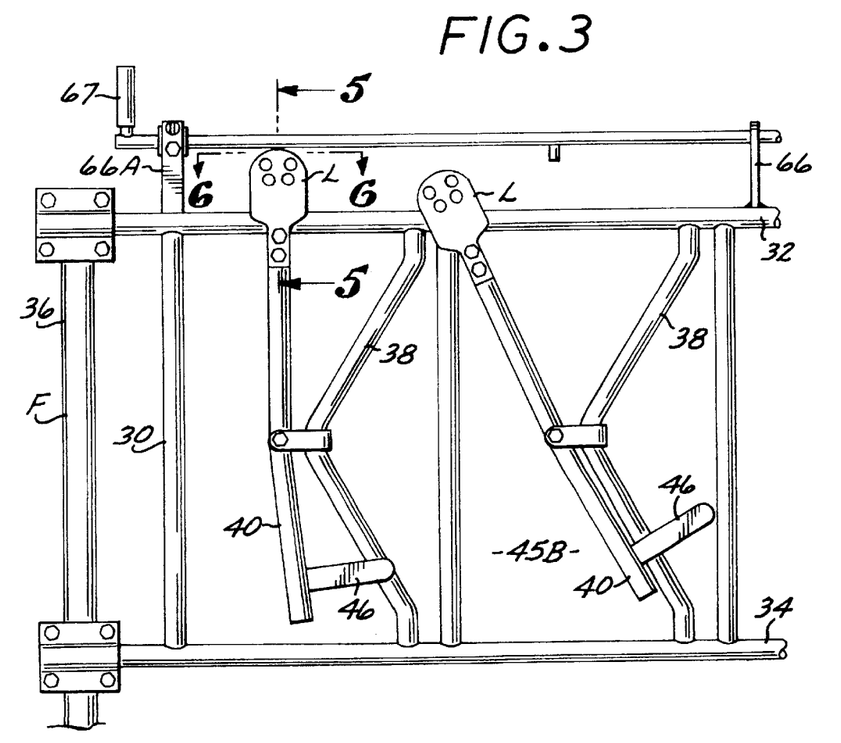
FIG. 3 is a view similar to FIG. 2, but showing the release stanchion in its downed cow position.

Referring now to the drawings, there is illustrated an improved cattle stanchion apparatus of the type having a frame F in which a plurality of fixed, upright, horizontally spaced-apart bars 30 extend between, and are welded to a tubular top rail 32 and a tubular bottom rail 34. The stanchion apparatus includes a plurality of tubular vertical end rails 36, only one of which is illustrated, each of which are secured to the ground or other supporting structure (not shown) at its lower end. At horizontally spaced intervals, tubular fixed stanchions 38, two of which are illustrated, are welded or otherwise rigidly secured at their upper and lower extremities to the top and bottom rails 32 and 34. At its midportion, each stanchion 38 is preferably bent or offset to the left as shown in FIGS. 1–3. A release stanchion 40 pivotally supported by a strap 41 is mounted at the intermediate portion of each offset stanchion 38. Although only two fixed stanchions 38 and release stanchions 40 are illustrated, it will be understood that the arrangement is repeated at regular intervals along the length of the stanchion apparatus frame F.

Each release stanchion 40 is mounted for pivotal movement between a closed, locked-in position as shown in FIG. 1, an open position illustrated in FIG. 2, and a downed cow position shown at the right-hand portion of FIG. 3. In the embodiment illustrated, each release stanchion pivots about an axis located between the opposite extremities of the release stanchion, the axis being defined by a pivot bolt 41 carried by strap 44. In FIG. 1 the left-hand release stanchion defines a head opening 45 to receive a cow's head when the stanchions are in a locked-in position, a wide head opening 45A when the stanchions are in a cow-release position of FIG. 2, and the wide downed-cow position 45B of FIG. 3. It will be seen that the configuration of the fixed stanchions and release stanchions define a relatively wide bottom opening 45B in the downed-cow position of FIG. 3.

Each release stanchion 40 is preferably pivotally attached to the offset fixed stanchions below its midpoint so as to tend to pivot to and remain in its open cow-release position of FIG. 2 in the absence of any other constraint. Various other means may be provided to induce the tendency for the release stanchion to pivot to the open position of FIG. 2. In the locked position of FIG. 1 head opening 45A enables an animal to easily extend its head through the opening for feeding from a feed trough (not shown) located on the other side of the stanchion apparatus opposite the animal. A bifurcated counterweight 46 is rigidly affixed to the lower portion of each release stanchion 40 to assist such stanchion to pivot to its open position of FIG. 2. Such counterweight also blocks the space 47 defined between the lower part of the release stanchion and the fixed stanchion 38 to deter a cow from inserting her head into such space.

When a cow extends her head into the opening 45A of FIG. 2 and dips her head into the feed trough, the lower portion of the release stanchion 40 is engaged by the animal's neck. This causes the release stanchion to pivot counterclockwise from its open position of FIG. 2 towards its closed, locked-in position of FIG. 1. As described hereinafter, the apparatus can be arranged to allow the release stanchion to pivot to its open position when the cow raises her head thereby freeing the animal to leave the feeding stall without any operator intervention. The apparatus can also be arranged to lock the release stanchion in its closed position so that only operator intervention allows the animal to leave the stall.

Figures 4, 5:
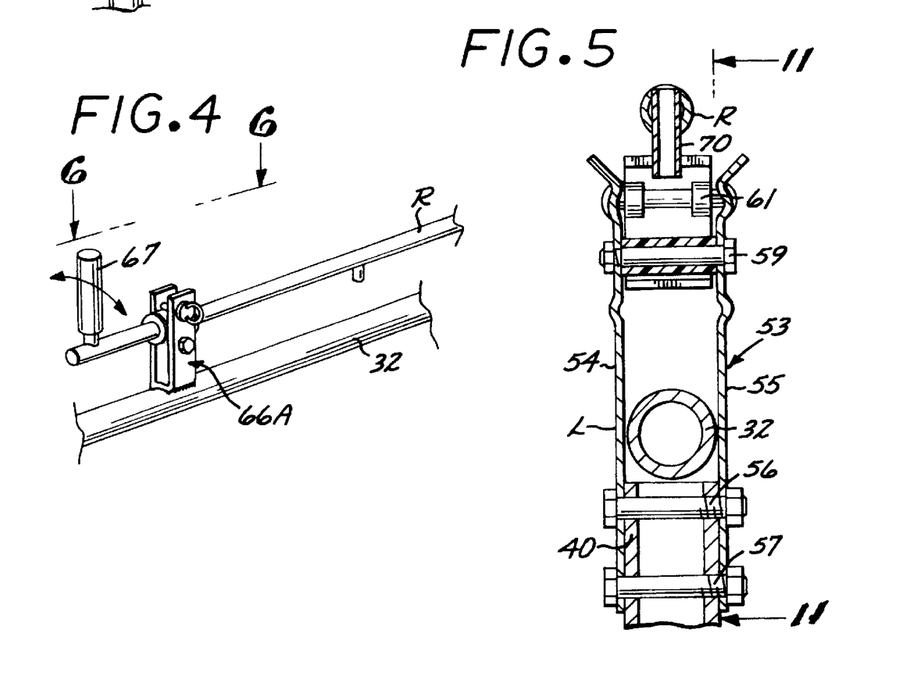
FIG. 4 is a broken perspective of a manually actuated operator assembly for the release stanchions.
FIG. 5 is a vertical sectional view taken in enlarged scale along line 5—5 of FIG. 3.
Figure 6:
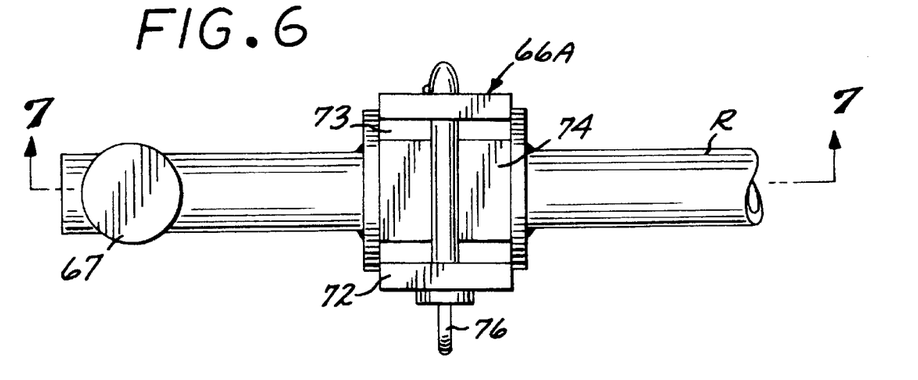
FIG. 6 is a horizontal sectional view taken in enlarged scale along line 6—6 of FIG. 3.
Figure 7:
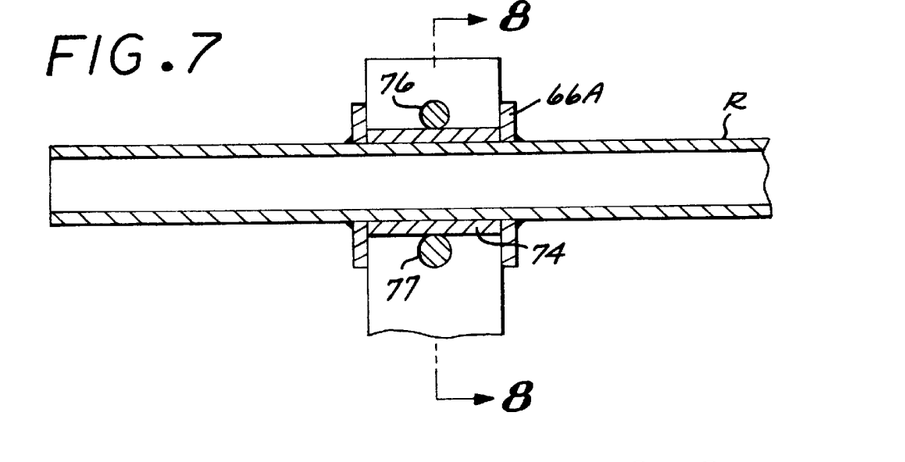
FIG. 7 is a fragmentary side elevational view taken along line 7—7 of FIG. 6.
Figure 8:
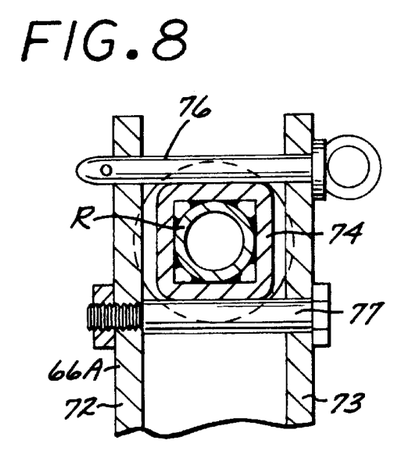
FIG. 8 is a horizontal sectional view taken in enlarged scale along line 8—8 of FIG. 7, showing a positioner rod in a locking position.
Figure 11:
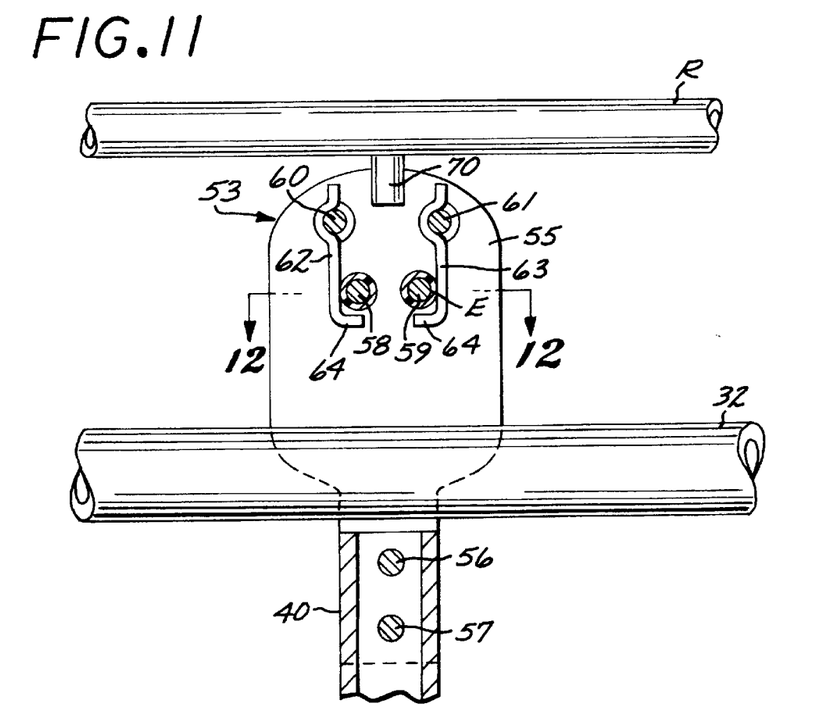
FIG. 11 is a front vertical view taken along line 11—11 of FIG. 5.
Figure 12:
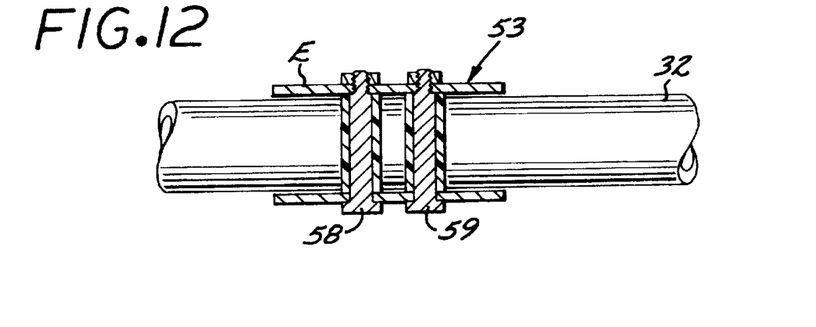
FIG. 12 is a horizontal sectional view taken along line 12—12 of FIG. 11.
Figure 13:
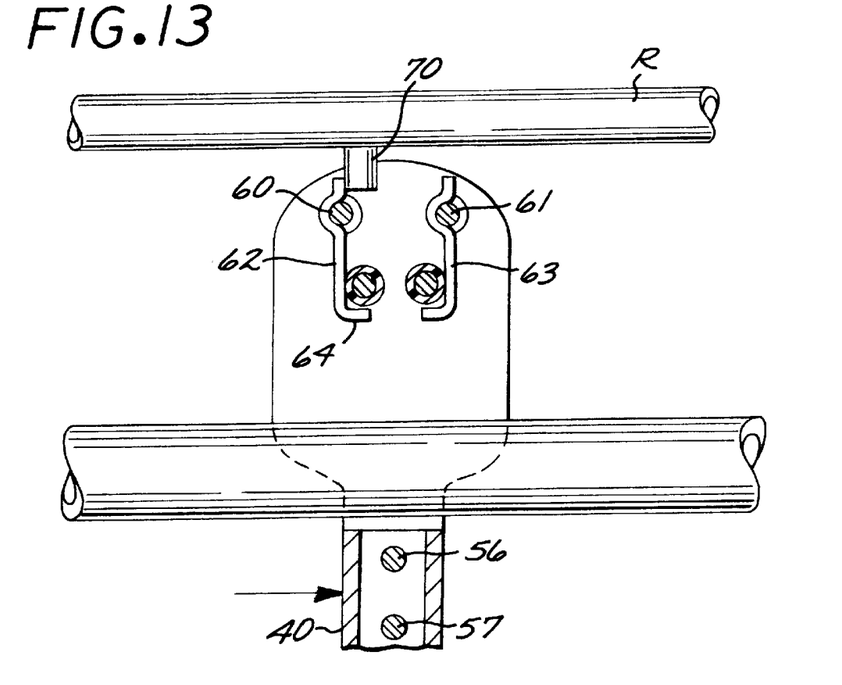
FIG. 13 is a fragmentary front elevational view showing a release stanchion in its locked position.

A latching means L is carried by the upper end of each release stanchion 40 comprising a bracket 53 defined by a pair of spaced apart like, vertical plates 54 and 55 secured at their lower ends to the release stanchion by 40 bolts 56 and 57, and straddling opposite sides of the top rail 32 as shown in FIG. 5. A pair of stop bolts 58 and 59 rigidly interconnect the upper ends of the plates such bolts are encased in a synthetic plastic (such as Nylon) encasement E. Sufficient clearance is provided between the top rail 32 and the plates to enable the bracket 53 to move generally longitudinally relative to the top rail during pivotal movement of the release stanchion 42. Above stop bolts 58 and 59, pivot pins 60 and 61 pivotally support a pair of like, parallel elongated latch fingers 62 and 63 which normally hang vertically from the pins. The lower portions of the latch fingers extend inwardly towards one another at a horizontal angle to define a finger grip, as shown in at 64 FIG. 11. Pins 60 and 61 are disposed above the center of gravity of the latch fingers so that the latch fingers normally hang vertically, as shown in FIG. 11. Stop bolts 58 and 59 restrain the latch fingers in their normal vertically extending position of FIG. 11.

The upper ends of the latch fingers are disposed below an elongated, positioner rod R horizontally and rotatably supported at intervals along its length by vertical brackets 66 that are welded to the upwardly-facing surface of the top rail 32, and a main support 66A disposed adjacent the left-hand portion of the rod. A handle 67 is keyed to one or both ends of the positioner rod R for manual rotation of such rod between its positions of FIGS. 1 and 2. Positioner rod R is provided with a plurality of locking pegs 70 fixedly secured at right angles to the positioner rod, as by welding, in vertical alignment with the central longitudinal axis of each bracket 53 when the release stanchions are disposed in their vertically extending closed, locked-in position of FIGS. 1, 5 and 11.

Figure 9:
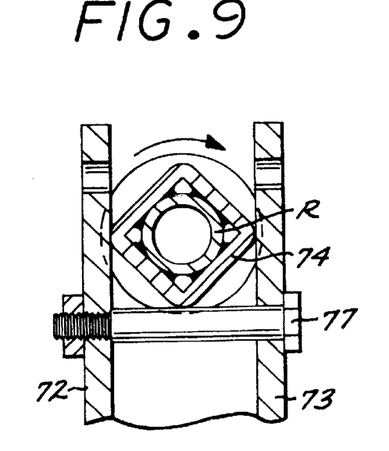
FIG. 9 is a view similar to FIG. 7 also showing the positioner rod in a released position.
Figure 10:
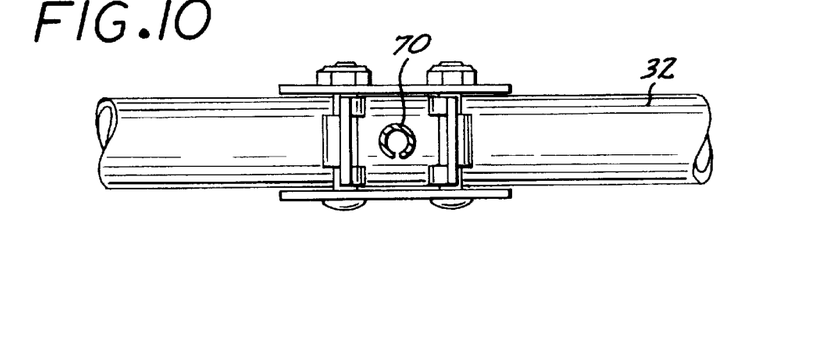
FIG. 10 is a top view of the positioner rod in a locked position.

As shown in FIGS. 6–9 the increment of the positioner rod R between sidewalls 72 and 73 of main support 66A defines a stopper 74 of square configuration. A removable locking pin 76 is slidably removably carried by the sidewalls 72 and 73 in the upper portion of the main support 66A. The lower end of stopper 74 abuts horizontal bolt 77. When such pin is removed from the main support the stopper block 74 can rotate with the positioner rod is clockwise, as indicated in FIG. 9, with rotation of the positioning rod being controlled by handle 67.

Figure 14:
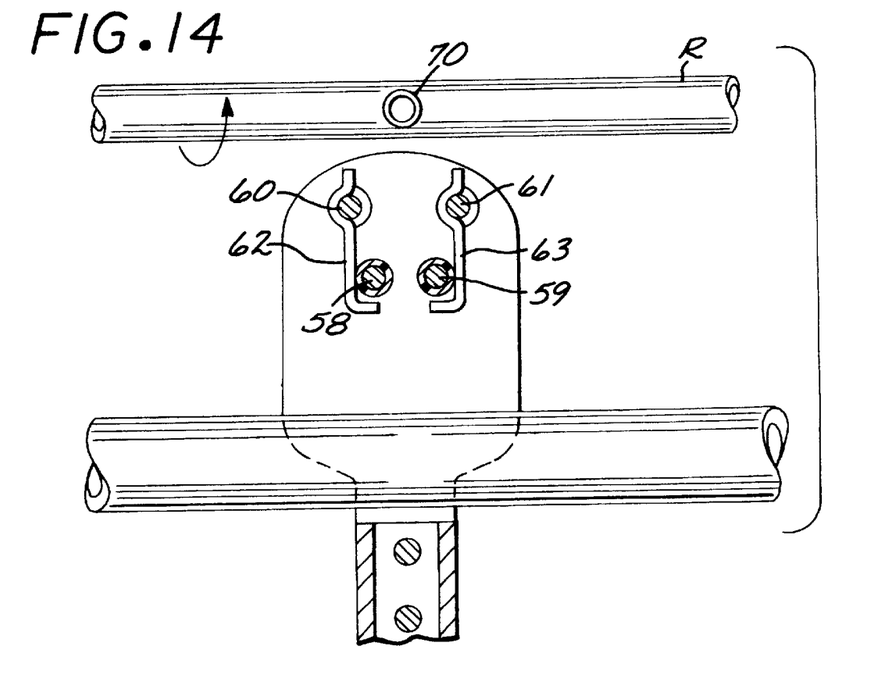
FIG. 14 is a view similar to FIG. 13 showing the release stanchion with its parts arranged to be movable to a released position.

As shown in FIGS. 1, 5, 7, 11 and 13, when the locking pegs 70 extend downwardly, such pegs will engage the upper ends of the latch fingers 62 and 63 as to restrain pivotal movement of brackets 53 and hence of release stanchion 40. Referring now to FIG. 14, when positioner rod R is rotated about 180 degrees from its upright position of FIGS. 1 and 11 to its position of FIGS. 2 and 14, the locking pegs are disposed out of the path of the latch fingers so the release stanchions can pivot from their locked-in position to an open cow-release position.

Figure 15:
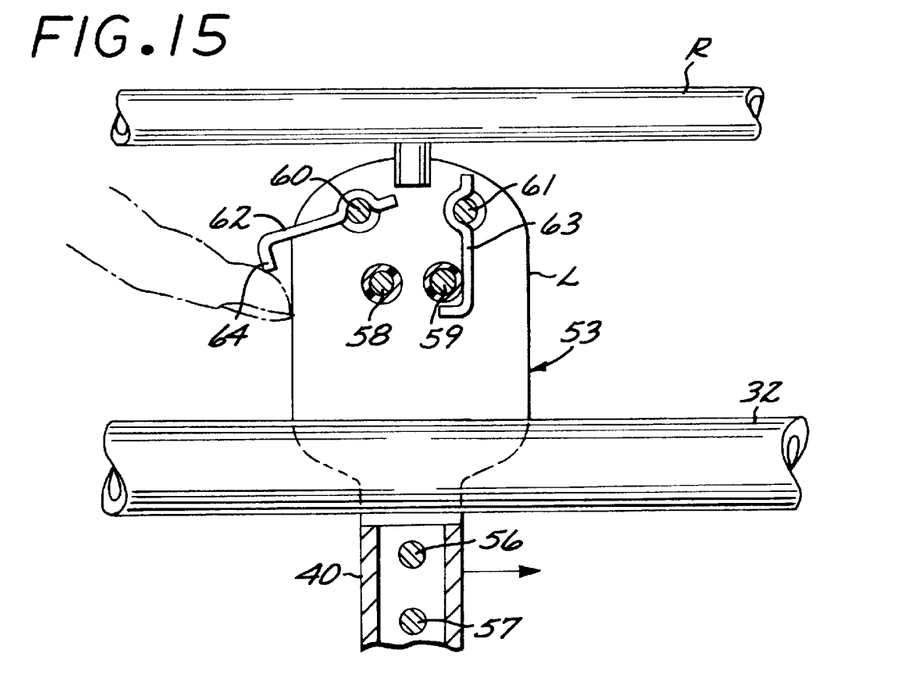
FIG. 15 is a view similar to FIGS. 13 and 14 showing how the release stanchion locking mechanism is manually actuated to permit the release stanchion to be moved to a downed cow position, or to a normal released position.

In the operation of the aforedescribed apparatus of FIGS. 1–16, each release stanchion 40 can be locked in its closed position of FIG. 1 by disposing the locking pegs 70 and the brackets 53 in vertical alignment as shown in FIGS. 1, 5, 11 and 13. In this position of the parts, the upper ends of the latch fingers 62 and 63 will engage the locking pegs so as to prevent pivotal movement of the release stanchion out of a generally vertically extending locked-in position. A cow cannot pivot the release stanchion open and the cows will therefor be locked in a position to be fed, milked or otherwise treated. If a dairyman wishes to permit the release stanchions to move to their open, cow-release position of FIG. 2, he will rotate the handle 67 which will in turn rotate the positioner rod R from its first position of FIGS. 1, 5, 11 and 13 through an angle of about 180° to a second position wherein the locking pegs 70 are no longer disposed in the path of the upper ends of the latching fingers, as shown in FIG. 14. The latch fingers may then pivot freely away from the locking pegs and the cows can independently move the release stanchions to their open cow-release position so as to be free to enter and leave the feeding stalls as they like. Provision of the Nylon encasement E insures smooth and quiet operation of the latching means L since the sound resulting from engagement of the latch fingers with the stop bolts 58 and 59 will be deadened. Should a cow fall down while the release stanchion 40 is in its locked-in position of FIG. 1, the dairyman can readily pivot the handle 67 so as to rotate the positioner rod R and move the locking pegs 70 out of their downwardly extending disposition. The release stanchion will then be free to pivot to its downed-cow position of FIG. 3. If the dairyman is not located within the vicinity of the handle 67, or if he does not wish other cows to be free to leave the stanchion apparatus, he can manually rotate the left latch finger 62 away from its stop 58 by engaging finger grip 64, as shown in FIG. 15. The upper end of latch finger 62 will clear the stop whereby release stanchion 40 will be free to rotate clockwise to its downed-cow position of FIG. 3 so as to safely permit withdrawal of the downed cow. Note that the release stanchion can only pivot clockwise away from the dairyman's hand to avoid trapping of any part of his body in the latching mechanism.

Figure 16:
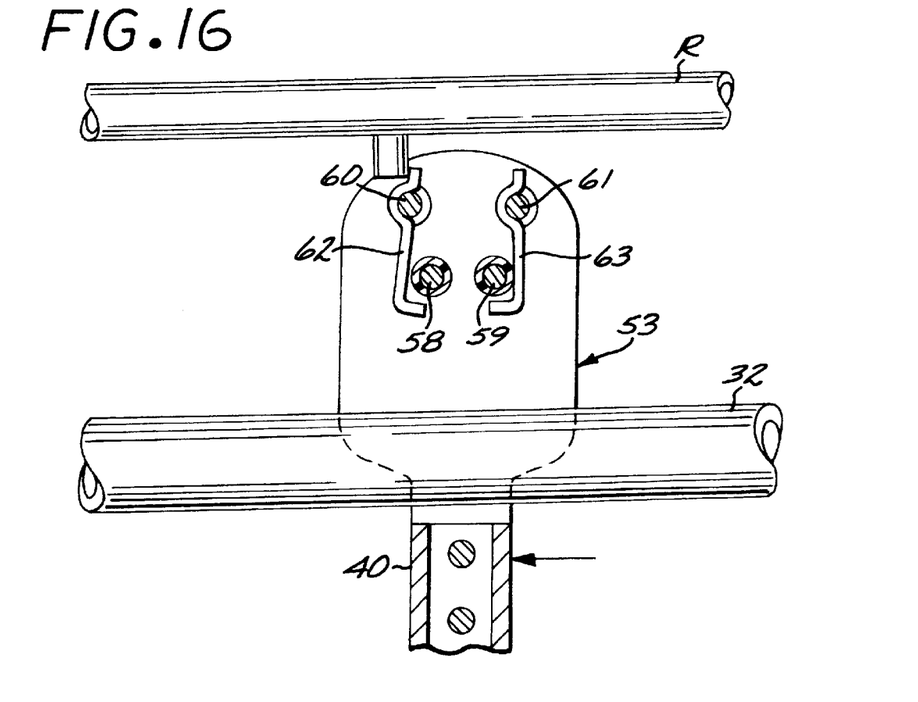
FIG. 16 is a view similar to FIGS. 13, 14 and 15 showing the parts of the locking mechanism arranged so as to permit the release stanchion to move into a locked position.

Should a dairyman wish to lock the cows into the stanchion apparatus when the release stanchions are disposed in their open position of FIG. 2, the positioner rod R is rotated so that the locking pegs 70 are rotated to a downwardly extending position. When a cow lowers its head within the opening 45A during feeding, the release stanchion 40 will automatically pivot counter-clockwise towards a locked-in position, as indicated in FIG. 16. Referring thereto, counter-clockwise movement of release stanchion 40 will cause the peg 70 to pivot the left latch finger 62 clockwise to permit positioning of the peg between the latch fingers to the locked-in position of FIG. 11. It will be understood that locking pin 76 will retain the positioner rod R against rotation until such pin is withdrawn from its FIG. 11 position.

Referring now to FIGS. 17–23 there is shown a modification of the stanchion apparatus disclosed in FIGS. 1–16 wherein like parts bear primed reference numerals. Referring thereto, the construction of the frame F; fixed stanchions 38' and release stanchions 40' is the same as described hereinbefore. The release stanchion of FIG. 13, however, is provided with a modified form of positioner rod mechanism.

Referring to such figures there is shown a frame F' which supports a plurality of fixed upright horizontally spaced-apart bars 30' are welded to a tubular top rail 32' and tubular bottom rail 34'. At horizontally spaced intervals tubular offset fixed stanchions 38' are secured to the top and bottom rails. Release stanchions 40' are pivotally supported at the intermediate portion of each fixed stanchion 38'. The release stanchions 40' are preferably pivotally attached to the fixed stanchions below its midpoint so as to tend to pivot to and remain in its open cow-release position. Bifurcated counter-weight 46' is rigidly affixed to the lower portion of release stanchion 40' as described hereinbefore to assist the release stanchion to pivot to its open position and also to block the space defined between the lower part of the release stanchion and the fixed stanchion to deter a cow from inserting her head into such space. The upper end of each release stanchion 40' carries a latching means L' of the type disclosed and described hereinbefore.

Figure 17:
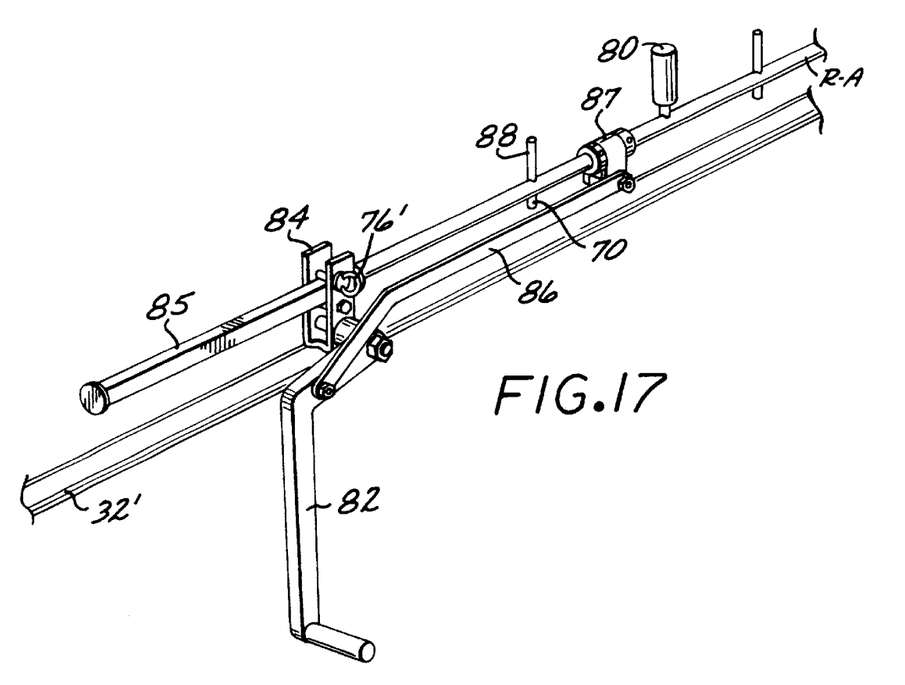
FIG. 17 is a broken front perspective view of a modified form of positioner rod mechanism embodying the present invention.

Such a modified form of positioner rod mechanism includes an elongated positioner rod R-A that not only rotates but is also longitudinally movable with respect to frame F' and the parts attached to such frame. Rotation of positioner rod R-A can be effected by means of one or more straight handles 80 affixed to and extending at right angles to positioner rod R-A. Referring to FIG. 17, longitudinal movement of positioner rod R-A is effected by means of a crank 82 pivotally connected to a main bifurcated positioner rod support 84 generally similar to support 66. The left-hand portion of the rod is of square cross-section as shown at 85 so as to be lockable against rotation by pin 76' in the same manner described before with respect to FIGS. 8 and 9. The intermediate portion of crank 82 is pivotally connected to a link arm 86 having its opposite end pivotally connected to a bracket 87 rigidly secured to positioner rod R-A. Rotation of the crank 82 between its positions of FIGS. 18 and 21 will effect longitudinal movement of the rod relative to frame F'. It should be understood that crank 82 can also be employed to effect rotation of the positioner rod. Positioner rod R-A is provided with a plurality of short locking pegs 70' and long locking pegs 88, with such pegs being in longitudinal alignment and arranged at right angles relative to the rod.

Figure 18:
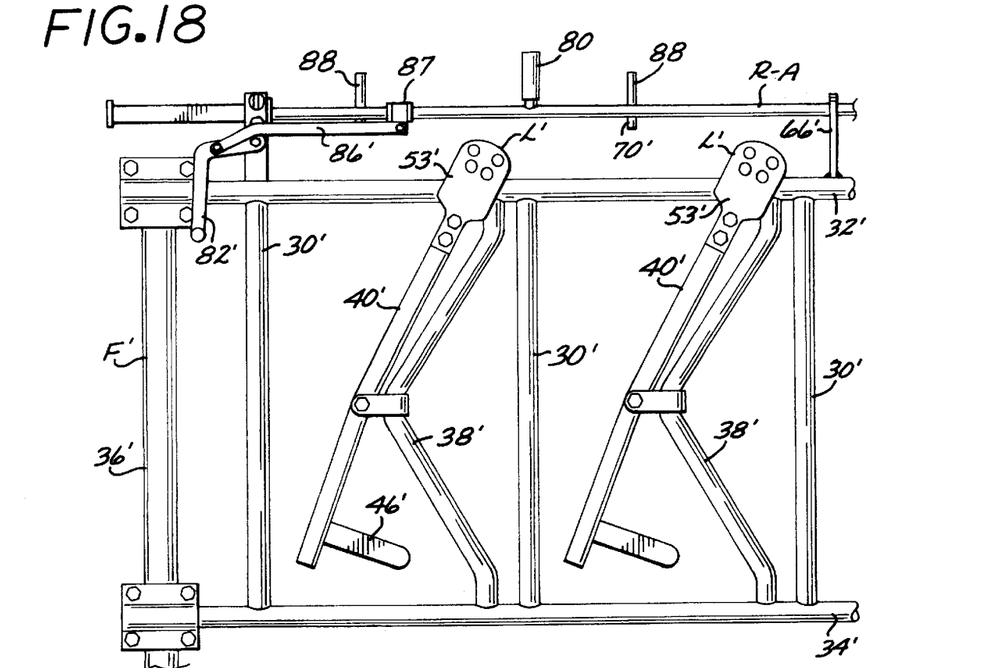
FIG. 18 is a front elevational view of a second form of cattle stanchion apparatus embodying the present invention utilizing the positioner rod mechanism of FIG. 17.
Figure 19:
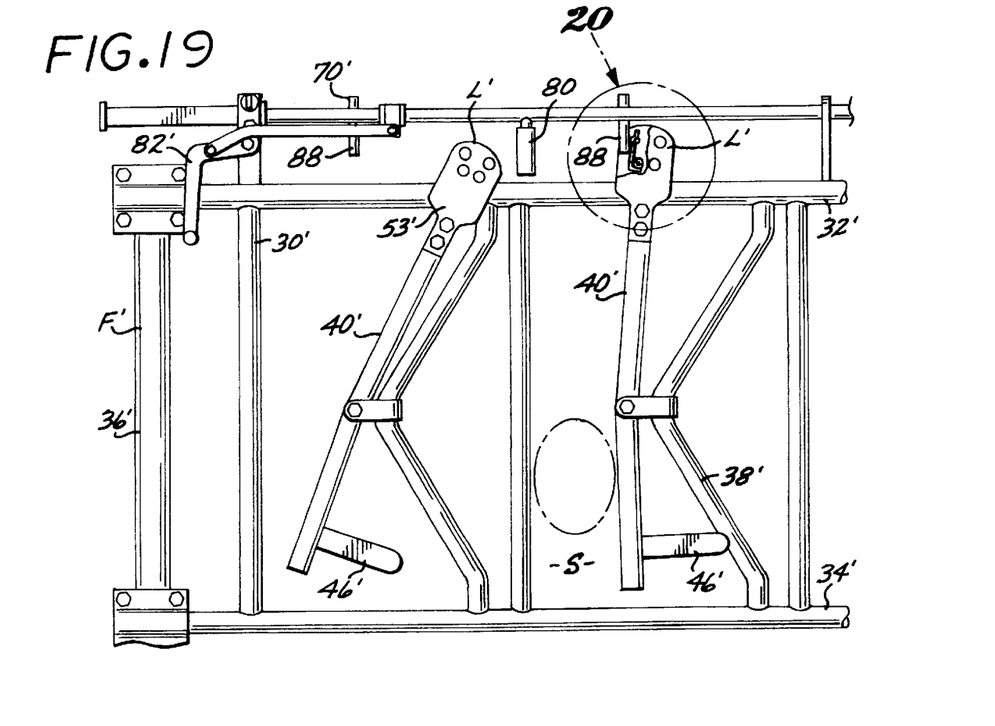
FIG. 19 is a front elevational view similar to FIG. 1 showing the parts of the apparatus arranged to permit the training of younger cows against improper entry
Figure 20:
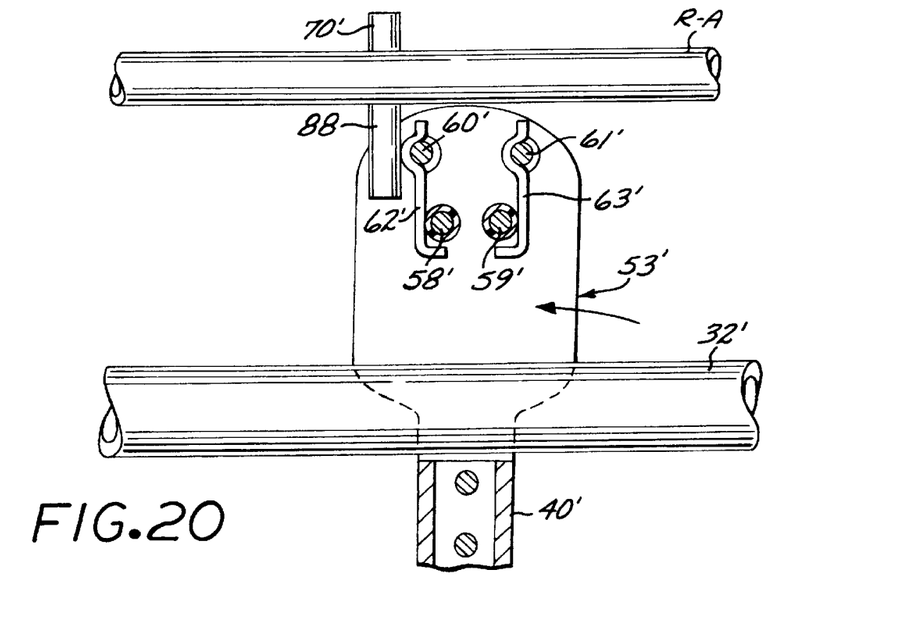
FIG. 20 is an enlarged view of the encircled area designated 20 in FIG. 19.
Figure 21:
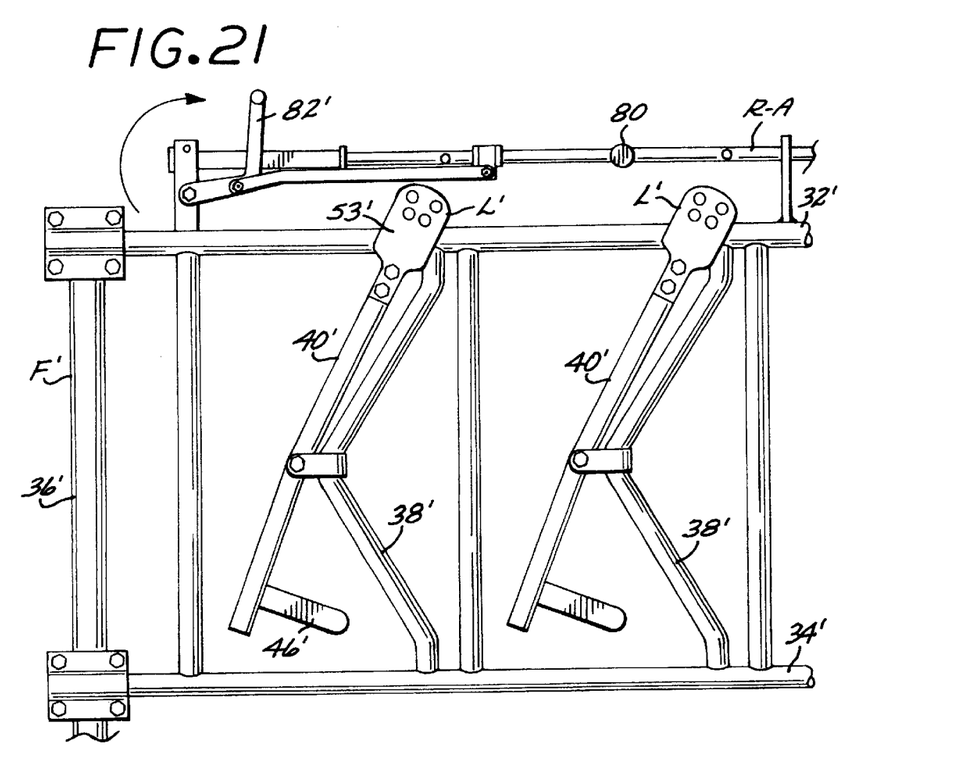
FIG. 21 is a view similar to FIG. 19 showing the release stanchions in position to be moved from a closed, locked-in position to an open position, or from an open position to a "locked-out" position, to prevent premature feeding.

The pivotal movement of the release stanchions 40' is controlled by rotation of the positioner rod R-A just as described hereinbefore with respect to FIGS. 1–16, with the short locking pegs 70' being selectively engageable with the latch fingers 62' and 63' of the brackets 53'. The embodiment of FIGS. 17–21, however, provide a unique cow training feature which prevents the cows from trying to obtain feed by extending their heads through the space between the bottom of the fixed stanchions and the release stanchions, which is not the proper way to enter the stanchion apparatus. In FIG. 18 the positioner rod R-A is arranged so as to have the long locking pegs 88 extend upwardly. In FIG. 19 the positioner rod has been rotated 180° to dispose the long locking pegs 88 in a downwardly extending position. As indicated at the right-hand portion of FIG. 19 and in FIG. 20, with the long pegs extending downwardly, each long peg abuts the left-hand side of left latch finger 62' of bracket 53' so as to prevent release stanchions 40' from pivoting out of their vertically extending locked-in position. Accordingly, while a cow can put her head between the fixed and release stanchions, she is prevented from dipping her head to the dotted outline position of FIG. 19 to feed. However, the cow can get her feed through the space between the upper portion of the release stanchion and the fixed bar 30', i.e. the cow can not push the top of the release stanchion all the way counter-clockwise so as to be able to get its head through the space between the lower portion of the release stanchion 40' and adjoining fixed bar 30', but can still feed. In FIG. 21 the positioner rod R-A has been rotated so as to dispose both the short pegs 70' and the long pegs 88 out of the path of the brackets 53' in order that the normal movement of the release stanchions to a cow-release position may be effected. Generally, training of the younger cows against trying to enter through the bottom space between the release and fixed bars takes place in a few weeks.

Figure 22:
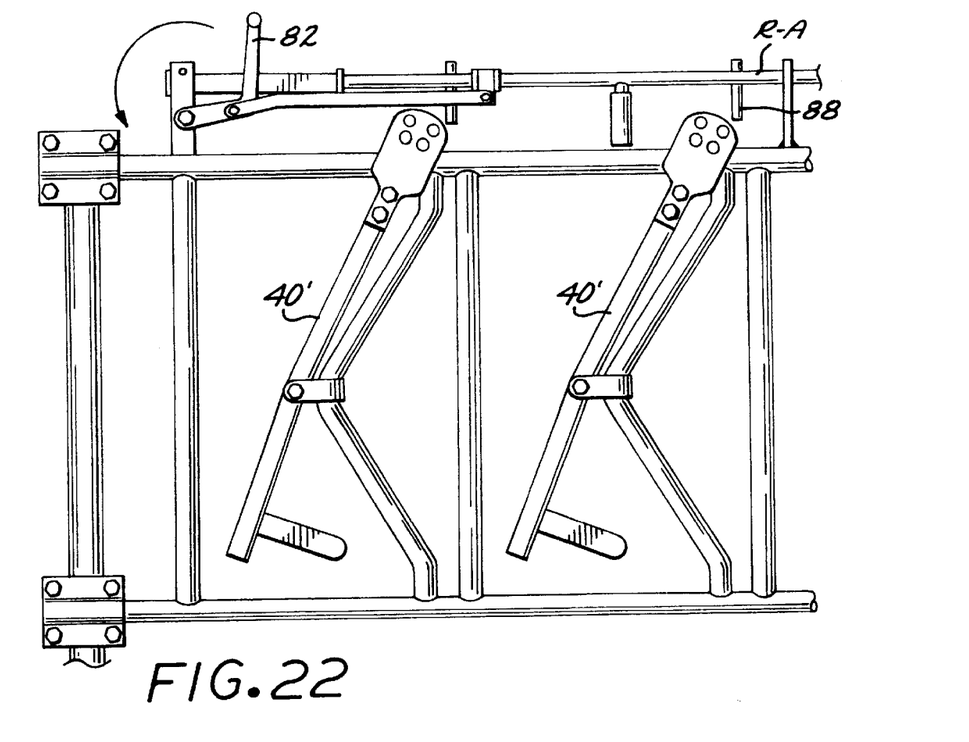
FIG. 22 is a front view of the apparatus arranged to be moved to a locked-out position.
Figure 23:
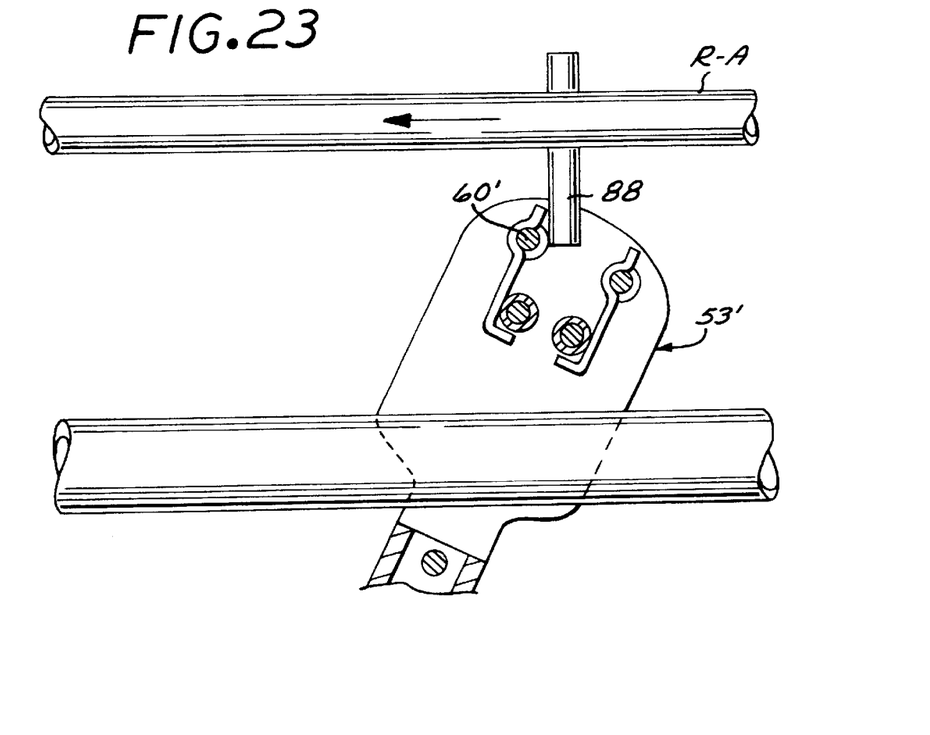
FIG. 23 is a broken front elevational view in enlarged scale showing how the release stanchions can be urged to a closed, locked-in position.

Referring now to FIGS. 22 and 23, the dairyman can readily move all of the release stanchions 40' to a locked-out position from their cow-release position of FIG. 22 by means of positioner rod R-A. This is accomplished by rotating the positioner rod so that the long locking pegs 88 extend downwardly. Crank 82 is then rotated counter-clockwise to draw the positioner rod to the left. As shown in FIG. 23, long locking peg 88 will engage the left-hand latching finger 58' to move release stanchion 40' counter-clockwise to its closed, locked-out position. The release stanchion will be locked in such closed position because long locking peg 88 will be disposed between latching fingers 62' and 63'. In this position the cows are prevented from premature feeding should the dairyman place feed in front of the stanchion apparatus prior to the time the cows are scheduled to eat such feed. The release stanchions may be easily moved to an open position by rotating crank 82 clockwise with the long locking pegs between the latching fingers and then rotating the positioner pegs in a generally horizontally extending position to again free the release stanchions for pivotal movement.

The two above-described embodiments of the present invention provide a fully controllable stanchion apparatus which is smoother and quieter in operation because of the Nylon encasements E, and provides a longer service life since contact between the positioner bar latching pegs and the latching mechanism only takes place when the release stanchions are in their locked position. The release stanchions are only locked once a day for about one half to one hour. Additionally, such stanchion apparatus provides important training for younger cattle against improper entry of the stanchion apparatus.

Various modification and changes may be made with respect to the foregoing description without departing from the spirit of the present invention.

What is claimed:

1. In cattle stanchion apparatus including fixed and release stanchions laterally spaced apart to define a head opening for a cow and fixed structure including mounting means supporting said release stanchions for pivotal movement from an open cow-release position in which the upper part of said head opening is enlarged to enable a cow to place or remove her head through said opening, to a closed, locked-in position in which said upper part of said head opening is narrowed to hold the cow's head in said opening, and beyond said closed, locked-in position to a downed-cow position in which said upper part of said opening is enlarged to enable the head of a downed cow to be withdrawn; the improvement comprising:

a bracket secured to the upper end of each release stanchion;

a pair of latch fingers pivotally supported at their upper ends to each bracket to normally hang downwardly;

a pair of stops on each bracket adjacent each lower end of the latch fingers to restrain such latch fingers against movement towards one another;

a horizontally extending positioner rod rotatably supported by the fixed structure above the brackets;

a plurality of locking pegs carried by the positioner rod to be rotated by the positioner rod between said open cow-release position wherein the pegs are out of the path of the latch fingers, and said closed, locked-in position wherein the pegs extend between the latch fingers to restrain pivotal movement of the release stanchions; and whereby when the latch fingers are in their open position each release stanchion will tend to pivot to either its open position or to its downed cow position, with one of the latch fingers of a release stanchion being selectively manually pivotable away from its stop to free such release stanchion for pivotal movement to its downed-cow position even when the locking pegs are disposed in their locked-in position.

2. Cattle stanchion apparatus as set forth in claim 1 wherein the stops are encased in a synthetic plastic material.

3. Cattle stanchion apparatus as set forth in claim 1 wherein the lower ends of the latch fingers extend inwardly to define a finger grip.

4. Cattle stanchion apparatus as set forth in claim 1 wherein the lower portion of the release stanchion is provided with a counterweight that blocks the space between the lower portion of the release stanchion and the adjacent fixed stanchion against entry by a cow.

5. Cattle stanchion apparatus as set forth in claim 3 wherein the stops are encased in a synthetic plastic material.

6. Cattle stanchion apparatus as set forth in claim 3 wherein the lower ends of the latch fingers extend inwardly to define a finger grip.

7. Cattle stanchion apparatus as set forth in claim 3 wherein the lower portion of the release stanchion is provided with a counterweight that blocks the space between the lower portion of the release stanchion and the adjacent fixed stanchion against entry by a cow.

8. Cattle stanchion apparatus as set forth in claim 6 wherein the lower portion of the release stanchion is provided with a counterweight that blocks the space between the lower portion of the release stanchion and the adjacent fixed stanchion against entry by a cow.

9. In cattle stanchion apparatus including fixed and release stanchions laterally spaced apart to define a head opening for a cow and fixed structure including mounting means supporting said release stanchions for pivotal movement from an open cow-release position in which the upper part of said head opening is enlarged to enable a cow to place or remove her head through said opening, to a closed, locked-in position in which said upper part of said head opening is narrowed to hold the cow's head in said opening, and beyond said closed, locked-in position to a downed-cow position in which said upper part of said opening is enlarged to enable the head of a downed cow to be withdrawn; the improvement comprising:

a bracket secured to the upper end of each release stanchion;

a pair of latch fingers pivotally supported at their upper ends to each bracket to normally hang downwardly;

a pair of stops on each bracket adjacent each lower end of each latch finger to restrain such latch fingers against movement towards one another;

a horizontally extending positioner rod rotatably and longitudinally slidably supported by the fixed structure above the brackets;

a plurality of short locking pegs carried by the positioner rod to be rotated by the positioner rod between said open cow-release position wherein the pegs are out of the path of the latch fingers, and said closed, locked-in position wherein the pegs extend between the latch fingers to restrain pivotal movement of the release stanchions;

whereby when the latch fingers are in their open position each release stanchion will tend to pivot to either its open position or to its downed cow position, with one of the latch fingers of a release stanchion being selectively manually pivotable away from its stop to free such release stanchion for pivotal movement to its downed-cow position even when the locking pegs are disposed in their locked-in position; and a plurality of long locking pegs carried by the positioner rod to be moved longitudinally by the positioner rod between an open cow-release position wherein the long pegs are out of the path of the latch fingers, and a cow-training position wherein the long pegs extend into engagement a latch fingers whereby the positioner rod can restrain pivotal movement of the release stanchion against further pivotal movement towards a closed position to thereby prevent a cow from moving the top of a release stanchion beyond a closed position so as to extend her head into the space between the bottom portion of the release stanchion and the adjoining fixed stanchion.

10. Cattle stanchion apparatus as set forth in claim 9 wherein the stops are encased in a synthetic plastic material.

11. Cattle stanchion apparatus as set forth in claim 9 wherein the lower portion of the release stanchion is provided with a counterweight that blocks the space between the lower portion of the release stanchion and the adjacent fixed stanchion against entry by a cow.

12. Cattle stanchion apparatus as set forth in claim 9 wherein the positioner rod can be further manipulated to dispose the long locking pegs between the latch fingers whereby the release stanchions can be moved to a locked-in position from their cow-release position.

13. Cattle stanchion apparatus as set forth in claim 10 wherein the lower portion of the release stanchion is provided with a counterweight that blocks the space between the lower portion of the release stanchion and the adjacent fixed stanchion against entry by a cow.

14. Cattle stanchion apparatus as set forth in claim 11 wherein the lower portion of the release stanchion is provided with a counterweight that blocks the space between the lower portion of the release stanchion and the adjacent fixed stanchion against entry by a cow.

15. Cattle stanchion apparatus as set forth in claim 12 wherein the lower portion of the release stanchion is provided with a counterweight that blocks the space between the lower portion of the release stanchion and the adjacent fixed stanchion against entry by a cow.

* * * * *